US012328471B2

(12) United States Patent
Schmelcher et al.

(10) Patent No.: US 12,328,471 B2
(45) Date of Patent: Jun. 10, 2025

(54) SYSTEMS AND METHODS FOR SYNCHRONIZATION OF INDEPENDENTLY ENCODED MEDIA STREAMS

(71) Applicant: Google LLC, Mountain View, CA (US)

(72) Inventors: Tristan Schmelcher, Sammamish, WA (US); Markus Kuhn, Zurich (CH); Laura McKnight, Somerville, MA (US); Alexander Kharitonov, Zurich (CH); David Kim, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/216,010

(22) Filed: Jun. 29, 2023

(65) Prior Publication Data
US 2025/0008181 A1    Jan. 2, 2025

(51) Int. Cl.
*H04N 21/21* (2011.01)
*H04N 21/20* (2011.01)
(Continued)

(52) U.S. Cl.
CPC ..... *H04N 21/4394* (2013.01); *H04N 21/2187* (2013.01); *H04N 21/8456* (2013.01)

(58) Field of Classification Search
CPC .... H04N 21/21; H04N 21/20; H04N 21/4394; H04N 21/2187; H04N 21/8456; G11B 27/00; G11B 27/30
(Continued)

(56) References Cited

U.S. PATENT DOCUMENTS

| 8,989,006 B2 | 3/2015 | Jost et al. |
| 10,469,880 B1 | 11/2019 | Kravis et al. |

(Continued)

FOREIGN PATENT DOCUMENTS

| WO | 2014128360 A1 | 8/2014 |
| WO | 2016008131 A1 | 1/2016 |

OTHER PUBLICATIONS

Bu, Jia Bing and Yu, He Wei, Applied Mechanics and Materials vols. 300-301 (2013) pp. 1677-1680, "Audio-video synchronization method based on playback time", Online available since Feb. 13, 2013 at www.scientific.net, © (2013) Trans Tech Publications, Switzerland, doi:10.4028/www.scientific.net/AMM.300-301.1677.

(Continued)

*Primary Examiner* — Daquan Zhao
(74) *Attorney, Agent, or Firm* — Lowenstein Sandler LLP

(57) ABSTRACT

A method includes receiving, by a processor, from a first server, a first plurality of frames associated with a media item. Each frame of the first plurality of frames is associated with a respective timestamp of a first plurality of timestamps generated by the first server. A second plurality of frames associated with the media item are received from a second server. The second plurality of frames are each associated with a respective timestamp of a second plurality of timestamps generated by the second server. An offset value between a first timestamp of the first plurality of timestamps and a second timestamp of the second plurality of timestamps is determined. A modified plurality of frames is generated by modifying, based on the offset value, each timestamp of a subset of the second plurality of timestamps. The modified plurality of frames is sent to the client device.

20 Claims, 5 Drawing Sheets

(51) Int. Cl.
*H04N 21/2187* (2011.01)
*H04N 21/439* (2011.01)
*H04N 21/845* (2011.01)
*G11B 27/00* (2006.01)
*G11B 27/30* (2006.01)

(58) Field of Classification Search
USPC ............... 386/201, 200, 202, 248, 239, 241
See application file for complete search history.

(56) References Cited

U.S. PATENT DOCUMENTS

| | | |
|---|---|---|
| 2010/0329360 A1 | 12/2010 | Jung |
| 2013/0173826 A1 | 7/2013 | Kim et al. |
| 2018/0167673 A1* | 6/2018 | Deen ................. H04N 21/47217 |
| 2021/0084362 A1* | 3/2021 | Chen .................. H04N 21/8133 |
| 2021/0368223 A1 | 11/2021 | You et al. |
| 2022/0210214 A1 | 6/2022 | Lapointe |

OTHER PUBLICATIONS

International Search Report and Written Opinion for International Application No. PCT/US2024/035128, mailed Sep. 19, 2024, 24 Pages.

* cited by examiner

SYSTEMS AND METHODS FOR SYNCHRONIZATION OF INDEPENDENTLY ENCODED MEDIA STREAMS

TECHNICAL FIELD

Aspects and implementations of the disclosure relate to content sharing platforms, and more specifically, to the synchronization of independently encoded media streams.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform can comment on the shared content, discover new content, locate updates, share content, and otherwise interact with the provided content. The shared content can include content from professional content creators, e.g., movie clips, TV clips, and music video items, as well as content from amateur content creators, e.g., video blogging and short original video items.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

An aspect of the disclosure provides a method that receives, by a processor, from a first server, a first plurality of frames of a first type associated with a media item. Each frame of the first plurality of frames is associated with a respective timestamp of a first plurality of timestamps generated by the first server. At least a subset of the first plurality of frames is sent to a client device. A second plurality of frames of the first type associated with the media item is received from a second server. The second plurality of frames are each associated with a respective timestamp of a second plurality of timestamps generated by the second server. An offset value between a first timestamp of the first plurality of timestamps and a second timestamp of the second plurality of timestamps is determined. A modified plurality of frames of the first type is generated by modifying, based on the offset value, each timestamp of a subset of the second plurality of timestamps. The modified plurality of frames is sent to the client device.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
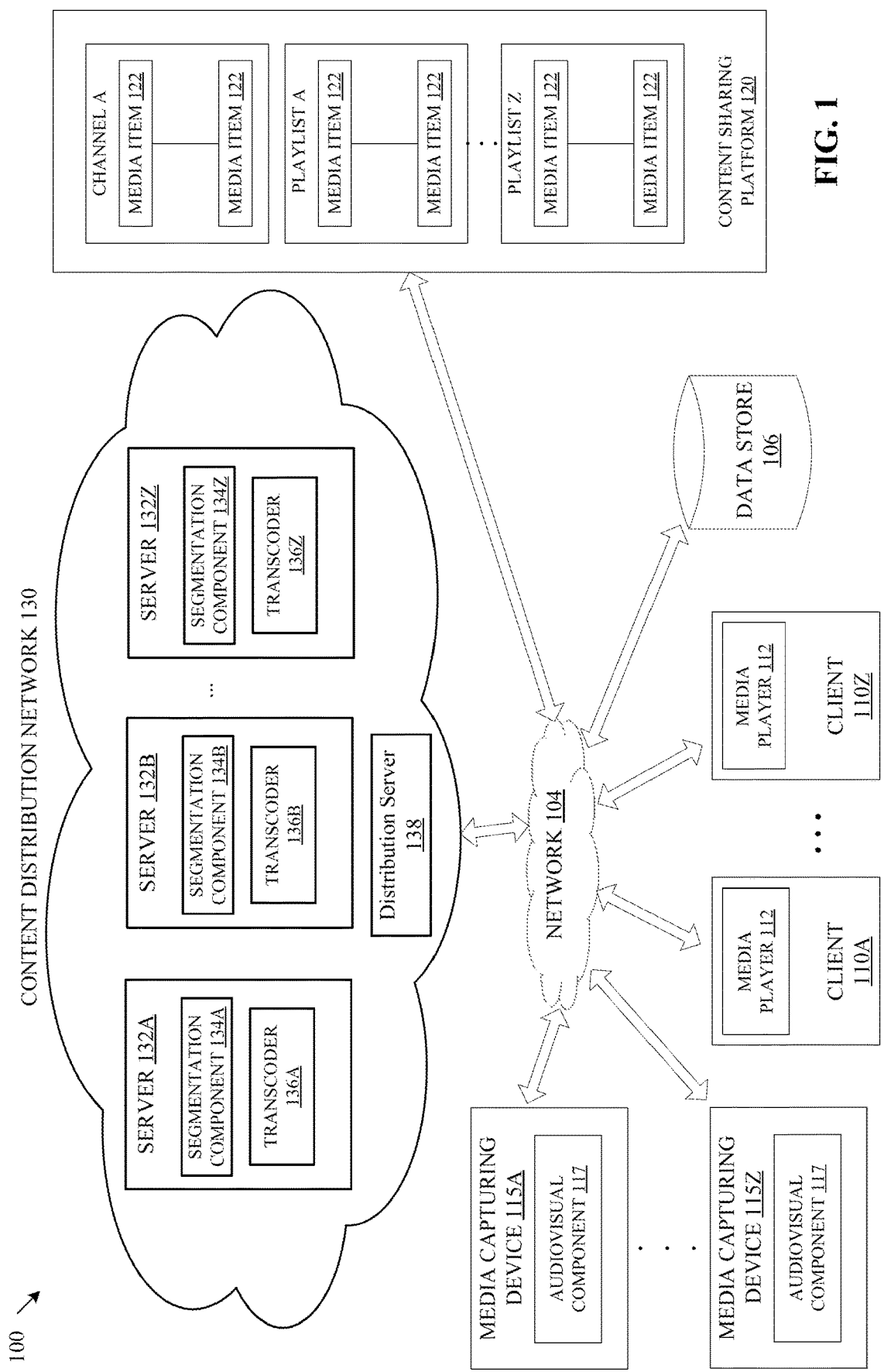
FIG. 1 illustrates an example system architecture, in accordance with an implementation of the disclosure.

Aspects of the present disclosure relate to synchronization of independently encoded media streams. A platform (e.g., a content delivery platform, etc.) can enable a user to access a media item (e.g., a video item, an audio item, etc.) provided by another user of the platform. For example, a first user of a content platform can provide (e.g., upload) a media item to the content platform via a graphical user interface (GUI) provided by the content platform to a client device associated with the first user. A second user of the content platform can access the media item provided by the first user via a content platform GUI at a client device associated with the second user.

The content delivery platform can stream, via a content distribution network (CDN), media items, such as live-stream video items, to one or more client devices for consumption by users. A CDN is a geographically distributed network of edge servers and their respective data stores. The goal of CDNs is to provide high availability and performance by distributing the media items spatially relative to user. A live-stream media item can refer to a broadcast or transmission of an event occurring in real-time, where the media item is concurrently transmitted, at least in part, as the event occurs, and where the media item is not available in its entirety when the transmission of the media item starts. A media item can include a video component and an audio component where the video component includes a stream of image frames, and the audio component includes a stream of audio frames. The image frames and/or audio frames can be rendered at an instant in time. Each frame can be marked with a timestamp and a frame duration value to enable sequential and correct playback on the media player (e.g., a video player) of the client device. A stream of image frames can be referred to as a video stream. A stream of audio frames can be referred to as an audio stream.

The CDN can receive a live-stream media item from a source entity, such as a content owner or content distributor. Content owners and/or content distributors typically transmit live-stream media items by delivering, via the CDN, the video stream and the audio stream of the media item to the media player of the client device. The video stream can be provided in an uncompressed file format, such as a serial digital interface (SDI) format, or in a compressed format, such as a Moving Picture Experts Group (MPEG) file format or Transport Stream (TS) file format. The audio stream can refer to audio data in an audio coding format (e.g., advanced audio coding (AAC), MP3, etc.).

A live-stream media item can be broken up into multiple segments to ease transmission, encoding, and decoding operations, where each segment includes a sequence of frames. In particular, the video stream and audio stream can be sent to an encoder of the CDN that converts the respective streams into respective segmented streams (e.g., a segmented video stream and a segmented audio stream). A segmented video stream can include one or more video segments, where a video segment refers to a sequence of image frames. A segmented audio stream can include one or more audio segments, where an audio segment refers to a sequence of audio frames. The respective segmented streams can be transmitted using Hypertext Transport Protocol (HTTP).

Each CDN includes a number of edge servers which can store the one or more of the segmented streams until requested by a media player of a client device. In some instances, a live-stream media item can be split into multiple media streams and sent to corresponding the edge servers for redundancy. The CDN can select from which edge server to send the segmented streams to the media player of the client device. In certain instances, the streaming edge server can experience failure, require a restart, require a firmware or software update, etc. In such instances, the CDN can switch to a different edge server to maintain the live-stream at the media player.

Each edge server can encode its respective stream of the live-stream media item using locally-synchronized timestamps (timestamps generated by a respective edge server in response to receiving a respective stream). For example, when a live-stream media item is transmitted to the CDN from a media capturing device (e.g., a camera), one or more edge servers can receive the stream of the live-stream media item and mark each image frame and/or audio frame of the media item with a timestamp. The timestamp can be based on a value obtained from a timer (e.g., a timer initiated by the edge server in response to receiving the live-stream media item, an internal time already running, etc.), from a clock (e.g., a local time zone clock, an astronomical clock, etc.), etc. The timestamps can be used to synchronize the audio and video streams and to enable switching playback from one edge node to another edge node.

Some media players require continuity of timestamps for playback. In particular, the media player can require that each successive frame be marked based on a value determined from the preceding frame's timestamp and duration. For example, for a frame marked with a timestamp of t=3 s, and a frame duration of 33.33 ms, the expected timestamp of the successive frame is 3.03333 s. As such, switching from a media stream encoded by one edge server to a media stream encoded by another edge server can cause the media player to experience a fault due to a successive frame having an unexpected timestamp. This can occur because each edge server can mark the frames of their respective streams using their local clock or timer. Experiencing a fault requires the media player or the CDN to perform fault correction procedures (e.g., a reconnect, failover operations, etc.). This can cause result in the unnecessary consumption of computing resources as well as cause the user watching the live-stream to endure a poor viewing experience (e.g., latency, a disconnect, missed content, etc.).

Aspects and implementations of the present disclosure address these and other shortcomings of the existing technology by enabling a content delivery network to synchronize media streams from different edge servers prior to delivery to a media player. In an example implementation, a distribution server of a CDN can receive a live-stream media item from an initial edge server. In particular, the distribution server can receive encoded audio segments and encoded video segments related to respective audio and video streams. The distribution server can transmit corresponding audio segments and video segments (each corresponding pair of audio segments and video segments can be referred to as a "media segment") to the media player of a client device. For each transmitted media segment, the distribution server can track the timestamps of the respective audio and image frames. For example, the distribution server can maintain a data structure, such as a metadata table, to track the timestamp data. This allows the distribution server to identify the expected timestamps of subsequent frames.

In response to the distribution server switching to a redundant edge server for obtaining the live-stream media item, the distribution server can determine a difference in values between the timestamps of the media segments received from the initial edge server and the timestamps of the media segments received from the redundant edge server. This difference can be referred to as an offset value. The distribution server can then apply the offset value to the respective timestamps of the audio frames and image frames received from the redundant edge server. For example, the distribution server can add the offset value to the timestamp values of the audio frames and image frames received from the redundant edge. The distribution server can then send the modified media segments to the media player. Since the media player receives media segments having audio frames and image frames with the correct subsequent values, the media player can render the audio frames and image frames without experiencing a fault.

In some implementations, the distribution server can also modify certain audio segments to prevent desynchronization of the audio stream with the video stream. In particular, since audio encoding and video encoding use different encoding operations, audio frames and image frames can be of different durations (e.g., image frames encoded using a 30 fps frame rate have a frame duration of 33.33 ms while audio frames encoded using AC3 have a frame duration of 32 ms). This can result in audio segments having a different duration than corresponding video segments, eventually leading to a noticeable desynchronization between the audio stream and the video streams rendered on the client device. To prevent desynchronization, the distribution server can add or remove audio frames from an audio segment. In particular, the distribution server can determine whether the audio stream is ahead of the respective video stream, or behind the respective video stream. In response to the audio stream being ahead of the respective video stream (e.g., a speaker's voice is heard before their lips move), the distribution server can add remove one or more audio frames to the subsequent audio segment. In response to the audio stream being behind the respective video steam, the distribution server can remove one or more audio frames from the subsequent audio segment. For example, the distribution server can obtain one or more audio frames from the end of a preceding audio segment and add these audio frames to the beginning of a subsequent audio segment.

Aspects of the present disclosure result in technological advantages in improved performance of the media player of a client device and improved overall performance of the content sharing platform and CDN. In particular, the aspects of the present disclosure enable a CDN to live-stream a media item from redundant edge node without subjecting a user to the latency, missed content, or a disconnect from watching the media item. As such, the technology disclosed herein enables the user to have a stable and uninterrupted viewing experience. Further, the aspects of the present disclosure enable a CDN to prevent the desynchronization of audio streams and video streams of a live-stream media item. Additionally, the technology disclosed herein can include reducing the consumption of computational, memory, and bandwidth resources by the content sharing platform and/or the CDN by preventing the implementation of resource consuming fault correction procedures (e.g., a reconnect, failover operations, etc.).

Implementations of the present disclosure often reference live-stream media items for simplicity and brevity. However, the teachings of the present disclosure can be applied to other media items, such as non-live-streaming media items (e.g., a media item available in its entirety when the transmission of the media item starts).

FIG. 1 illustrates an example system architecture 100, in accordance with one implementation of the present disclosure. The system architecture 100 (also referred to as "system" herein) includes a content sharing platform 120 (also referred to as a "content distribution platform" herein), a data store 106, client devices 110A-110Z (generally referred to as "client device(s) 110" herein), media capturing devices 115A-115Z connected to a network 104, and a content distribution network (CDN) 130 (also referred to as a "content delivery network" herein). The CDN 130 can include server machines 132A-132Z (also referred to as "server(s) 132A-132Z" herein) and distribution server 138.

Network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Data store 106 can be a persistent storage that is capable of storing content items (such as media items) as well as data structures to tag, organize, and index the content items. Data store 106 can be hosted by one or more storage devices, such as main memory, magnetic or optical storage-based disks, tapes or hard drives, NAS, SAN, and so forth. In some implementations, data store 106 can be a network-attached file server, while in other implementations data store 106 can be some other type of persistent storage such as an object-oriented database, a relational database, and so forth, that can be hosted by content sharing platform 120 or one or more different machines coupled to the content sharing platform 120. In some implementations, data store 106 can be coupled to content sharing platform 120 via network 104.

Client devices 110A-110Z can each include computing devices such as personal computers (PCs), laptops, mobile phones, smart phones, tablet computers, netbook computers, network-connected televisions, etc. In some implementations, client devices 110A-110Z can also be referred to as "user devices." In some implementations, each client device 110A-110Z can include a media player 112 (or media viewer). In some implementations, the media players 112 can be applications that allow users to play back, view, or upload content, such as images, video items, web pages, documents, audio items, etc. For example, the media player 112 can be a web browser that can access, retrieve, present, or navigate content (e.g., web pages such as Hyper Text Markup Language (HTML) pages, digital media items, etc.) served by a web server. The media player 112 can render, display, or present the content (e.g., a web page, a media viewer) to a user. The media player 112 can also include an embedded media player (e.g., a Flash® player or an HTML5 player) that is embedded in a web page (e.g., a web page that can provide information about a product sold by an online merchant). In another example, the media player 112 can be a standalone application (e.g., a mobile application, or native application) that allows users to playback digital media items (e.g., digital video items, digital images, electronic books, etc.). According to aspects of the present disclosure, the media player 112 can be a content sharing platform application for users to record, edit, and/or upload content for sharing on the content sharing platform. As such, the media players 112 can be provided to the client devices 110A-110Z by content sharing platform 120. For example, the media players 112 can be embedded media players that are embedded in web pages provided by the content sharing platform 120. In another example, the media players 112 can be applications that are downloaded from content sharing platform 120.

Media capturing devices 115A-115Z can each include computing devices such as video recorders, mobile phones, smart phones, tablet computers, or any other device capable of capturing audio data and/or image data sensed by the device to create a media item. Media capturing devices 115A-115Z can include an audiovisual component 117 that can generate audio and/or video data to be streamed to CDN 130. In some implementations, the audiovisual component 117 can include a device (e.g., a microphone) to capture an audio signal and generate audio data (e.g., an audio file or audio stream) based on the captured audio signal. In some implementations, audiovisual component 117 can also include an image capture device (e.g., a camera) to capture images and generate video data (e.g., a video stream) of the captured data of the captured images. Media capturing devices 115A-115Z can transmit the generated audio stream and/or video stream to one or more server machines 132A-132Z of CDN 130.

In some implementations, content sharing platform 120, server machines 132A-132Z, and distribution server 138 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to media items or provide the media items to the user. For example, content sharing platform 120 can allow a user to consume, upload, search for, approve of ("like"), disapprove of ("dislike"), or comment on media items. Content sharing platform 120 can also include a website (e.g., a webpage) or application back-end software that can be used to provide a user with access to the media items.

In some implementations of the disclosure, a "user" can be represented as a single individual. However, other implementations of the disclosure encompass a "user" being an entity controlled by a set of users and/or an automated source. For example, a set of individual users federated as a community in a social network can be considered a "user". In another example, an automated consumer can be an automated ingestion pipeline, such as a topic channel, of the content sharing platform 120.

The content sharing platform 120 can include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" can also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels can have their own feeds. For example, when navigating to a home page of a channel on the content sharing platform, feed items produced by that channel can be shown on the channel home page. Users can have a syndicated feed, which is a feed including at least a subset of the content items from all of the channels to which the user is subscribed. Syndicated feeds can also include content items from channels that the user is not subscribed. For example, content sharing platform 120 or other social networks can insert recommended content items into the user's syndicated feed, or can insert content items associated with a related connection of the user in the syndicated feed.

Each channel can include one or more media items 122. Examples of a media item 122 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, the media item 122 can be a live-stream media item. In some implementations, media item 122 is also referred to as content or a content item.

For brevity and simplicity, rather than limitation, a video item, audio item, or gaming item are used as an example of a media item 122 throughout this document. As used herein, "media," media item," "online media item," "digital media," "digital media item," "content," and "content item" can include an electronic file that can be executed or loaded using software, firmware or hardware configured to present the digital media item to an entity. In one implementation, content sharing platform 120 can store the media items 122 using the data store 106. In another implementation, content sharing platform 120 can store video items or fingerprints as electronic files in one or more formats using data store 106.

In some implementations, media items 122 are video items. A video item is a set of sequential image frames representing a scene in motion. For example, a series of sequential image frames can be captured continuously or later reconstructed to produce animation. Video items can be presented in various formats including, but not limited to, analog, digital, two-dimensional and three-dimensional video. Further, video items can include movies, video clips or any set of animated images to be displayed in sequence. In addition, a video item (or media item) can be stored as a video file that includes a video component and an audio component. The video component can refer to video data in a video coding format or image coding format (e.g., H.264 (MPEG-4 AVC), H.264 MPEG-4 Part 2, Graphic Interchange Format (GIF), WebP, etc.). The audio component can refer to audio data in an audio coding format (e.g., advanced audio coding (AAC), MP3, etc.). It can be noted GIF can be saved as an image file (e.g., .gif file) or saved as a series of images into an animated GIF (e.g., GIF89a format). It can be noted that H.264 can be a video coding format that is a block-oriented motion-compensation-based video compression standard for recording, compression, or distribution of video content, for example.

In some implementations, the media item can be streamed, such as in a livestream, to one or more of client devices 110A-110Z. It is be noted that "streamed" or "streaming" refers to a transmission or broadcast of content, such as a media item, where the received portions of the media item can be played back by a receiving device immediately upon receipt (within technological limitations) or while other portions of the media content are being delivered, and without the entire media item having been received by the receiving device. "Stream" can refer to content, such as a media item, that is streamed or streaming. A live-stream media item can refer to a live broadcast or transmission of a live event, where the media item is concurrently transmitted (e.g., from media capturing device 115A-115Z), at least in part, as the event occurs to a receiving device, and where the media item is not available in its entirety.

In some implementations, content sharing platform 120 can allow users to create, share, view or use playlists containing media items (e.g., playlist A-Z, containing media items 122). A playlist refers to a collection of media items that are configured to play one after another in a particular order without any user interaction. In some implementations, content sharing platform 120 can maintain the playlist on behalf of a user. In some implementations, the playlist feature of the content sharing platform 120 allows users to group their favorite media items together in a single location for playback. In some implementations, content sharing platform 120 can send a media item on a playlist to client device 110 for playback or display. For example, media viewer 112 can be used to play the media items on a playlist in the order in which the media items are listed on the playlist. In another example, a user can transition between media items on a playlist. In yet another example, a user can wait for the next media item on the playlist to play or can select a particular media item in the playlist for playback.

In some implementations, the user can access content on sharing platform 120 through a user account. The user can access (e.g., log in to) the user account by providing user account information (e.g., username and password) via an application on client device 110 (e.g., media viewer 112). In some implementations, the user account can be associated with a single user. In other implementations, the user account can be a shared account (e.g., family account shared by multiple users) (also referred to as "shared user account" herein). The shared account can have multiple user profiles, each associated with a different user. The multiple users can login to the shared account using the same account information or different account information. In some implementations, the multiple users of the shared account can be differentiated based on the different user profiles of the shared account.

In some implementations, an authorizing data service (also referred to as a "core data service" or "authorizing data source" herein) is a highly-secured service that has access to data pertaining to user accounts on the content sharing platform 120 and that can use this data to decide whether to authorize a user account to obtain requested content. In some implementations, the authorizing data service can authorize a user account (e.g., client device associated with the user account) access to requested content, authorize delivery of the requested content to the client device, or both. Authorization of the user account to access the requested content can involve authorizing what content is accessed and who is permitted to access the content. Authorization of the delivery of the content can involve authorizing how the content is delivered. In some implementations, the authorizing data service can use user account information to authorize the user account. In some implementations, an authentication token associated with client device 110A-110Z or media player 112 can be used to determine whether to authorize the user account and/or playback of requested content. In some implementations, the authorizing data service is part of content sharing platform 120. In other implementations, the authorizing data service can be an external service, such as a highly-secured authorizing service offered by a third-party.

As noted above, CDN 130 can include one or more nodes or edge servers, represented as server machines 132A-132Z (generally referred to as "server machine(s) 132" or "server(s) 132" herein). In some implementations, CDN 130 includes a geographically distributed network of servers that work together to provide fast delivery of content. The network of servers are geographically distributed to provide high availability and high performance by distributing content or services based, in some instances, on proximity to client devices 110A-110Z. The closer a CDN server machine 132A-132Z is to a client device 110A-110Z, the faster the content can be delivered to the client device 110A-110Z.

For example, different server machines 132A-132Z can be distributed geographically within a particular country or across different countries. User A using client device 110A located in the Great Britain can request to obtain content hosted by content sharing platform 120. The request can be received by an authorizing data service of content sharing platform 120 and the user account associated with user A can be authorized to obtain the requested content. Subsequent to authorization, content sharing platform 120 can send a resource locator, such as a uniform resource locator (URL), to the client device 110A. A resource locator can refer to a reference that specifies a location or address of a resource (e.g., content) on a computer network and a mechanism for retrieving the resource. The resource locator can direct the client device 110A to obtain the content from a server machine 132 of content distribution network 130 that is located geographically proximate to client device 110A. For example, the resource locator can direct the client device 110A to obtain the requested content from a particular server machine 132 of content distribution network 130 that is also located in Great Britain. In another example, another user B using client device 110B (not shown) located in the west coast of the United States requests to obtain the same content as user A. The request can be received by the authorizing data service of content sharing platform 120 and the user account associated with user B can be authorized to obtain the requested content. Subsequent to authorization, content sharing platform 120 can send a resource locator to the client device 110B. The resource locator can direct the client device 110B to obtain the content from a server machine 132 of content distribution network 130 that is located geographically proximate to client device 110B. For example, the resource locator can direct the client device 110B to obtain the requested content from a server machine 132 of content distribution network 130 located at the west coast of the United States.

Each server machine 132A-132Z can include a respective media segmentation component 134A-134Z and transcoder 136A-136Z. Media segmentation component 134A-134Z can segment the media item 122 into media segments. In an example, media segmentation component 122 can receive a live-streamed media item and convert the media item into an intermediate data structure, such as an intermediate stream. Media segmentation component 122 can then segment the media stream into media segments.

Media segments can be different portions of a particular media item 112 (e.g., a live streaming media item). In an example, a media item can be a sequence of media segments that include the segmented content of a media item 112. Each media segment can be an audio segment or a video segment. A video segment can include a sequence of consecutive image frames between a pair of keyframes. A keyframe is a frame that marks the beginning or ending of a particular sequence. Each image frame of a video segment can be related to a timestamp (can be referred to as an "image frame timestamp"), a frame duration value, a frame rate value, etc. The frame timestamps can indicate the order the frames are to be produced (e.g., displayed) during playback.

An audio segment can include a sequence of consecutive audio frames between a pair of desired segment boundaries. Each audio frame of an audio segment can be related to a timestamp (can be referred to as an "audio frame timestamp") and/or a frame duration value (e.g., a number of samples per frame, a live sampling rate, a frame duration, etc.). The timestamps and frame duration values can be stored in a data structure (e.g., metadata table), can be appended to each frame as supplemental data, etc.

The segmented content (e.g., audio segments, video segments) can be in the same format as the media item or can be in a different format. The sequence can be a continuous sequence of non-overlapping media segments. For example, a media item with a duration of X can be split into four segments that each have a fixed duration of X/4 or an average duration of X/4 (i.e., when variably segmented). In another example, one or more of the segments can overlap with one or more of the other segments. For example, a media item with a duration of X can be split into five segments and four of the segments can include a sequence of image content (e.g., video content) and one segment can include all of the audio content. The segments with the image content cannot overlap one another but the audio content can overlap each of the four image content segments. Each segment can be identified by a segment identification data (e.g., video_id_123, audio_id_123, etc.) and the identification data for a subsequent video segment in the sequence of the video segments can be incremented by a fixed amount (e.g., video_id_124, audio_id_124, etc.).

Transcoder 134A-134Z can select one or more encoders (e.g., transcoders) to modify the media segments. In some implementations, transcoder 134A-134Z can first determine the complexity of the media segments (e.g., the video segments and/or the audio segments) by analyzing the live-streamed media item or by analyzing a portion of the media item, such as the metadata of the media item or one or more segments of the media item. The analysis can identify coding complexity data for each of the media segments and the coding complexity data can be used to determine one or more measurements that can represent the image or auditory complexity of a segment of a media item.

Transcoder 134A-134Z can then select one or more encoders to modify the media segments. In some implementations, transcoder 134A-134Z can select multiple different encoders to encode multiple different media segments of the same media item. For example, some of the segments can be encoded using a first transcoder and other segments of the same media item can be encoded using a different transcoder. In some implementations, audio segments can be encoded using a codec (e.g., Advanced Audio Coding (AAC) formats, audio codec 3 (AC3) formats, etc.) and video segments can be encoded based on a framerate (e.g., 24 frames per second, 30 frames per second, 60 frames per second, etc.).

Once the media item has been transcoded, it can be stored in a data store. In some implementations, the transcoded media segments can be stored on data store 106. In some implementations, the transcoded media segments can be stored on a local data store (similar to data store 106) of the respective server 132A-132Z.

Distribution server 138 can perform aspects of the disclosure described herein. For example, distribution server 138 can track which server machines 132A-132Z are encoding and storing media segments related to a live-stream media item. Distribution server 138 can further track local timestamps data related to each of those server machines 132A-132Z. Distribution server 138 can also modify the video and audio segments in response to a switch of the server machines 132A-132Z used to stream the live-stream media item. This will be explained in more detail below.

In some implementations, content distribution network 130 is part of content sharing platform 120. In other implementations, the content distribution network 130 is a third-party platform that provides CDN services to content sharing platform 120. In other implementations, some of content distribution network 130 can be operated by content sharing platform 120 and another part of content distribution network 130 can be operated by a third-party.

In general, functions described in one implementation as being performed by the content sharing platform 120, and/or content distribution network 130 can also be performed on the client devices 110A through 110Z in other implementations, if appropriate. In addition, the functionality attributed to a particular component can be performed by different or multiple components operating together. The content sharing platform 120 or content distribution network 130 can also be accessed as a service provided to other systems or devices through appropriate application programming interfaces, and thus is not limited to use in websites.

Although implementations of the disclosure are discussed in terms of content sharing platforms and promoting social network sharing of a content item on the content sharing platform 120, implementations can also be generally applied to any type of social network providing connections between users, or content delivery platform. Implementations of the disclosure are not limited to content sharing platforms that provide channel subscriptions to users.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
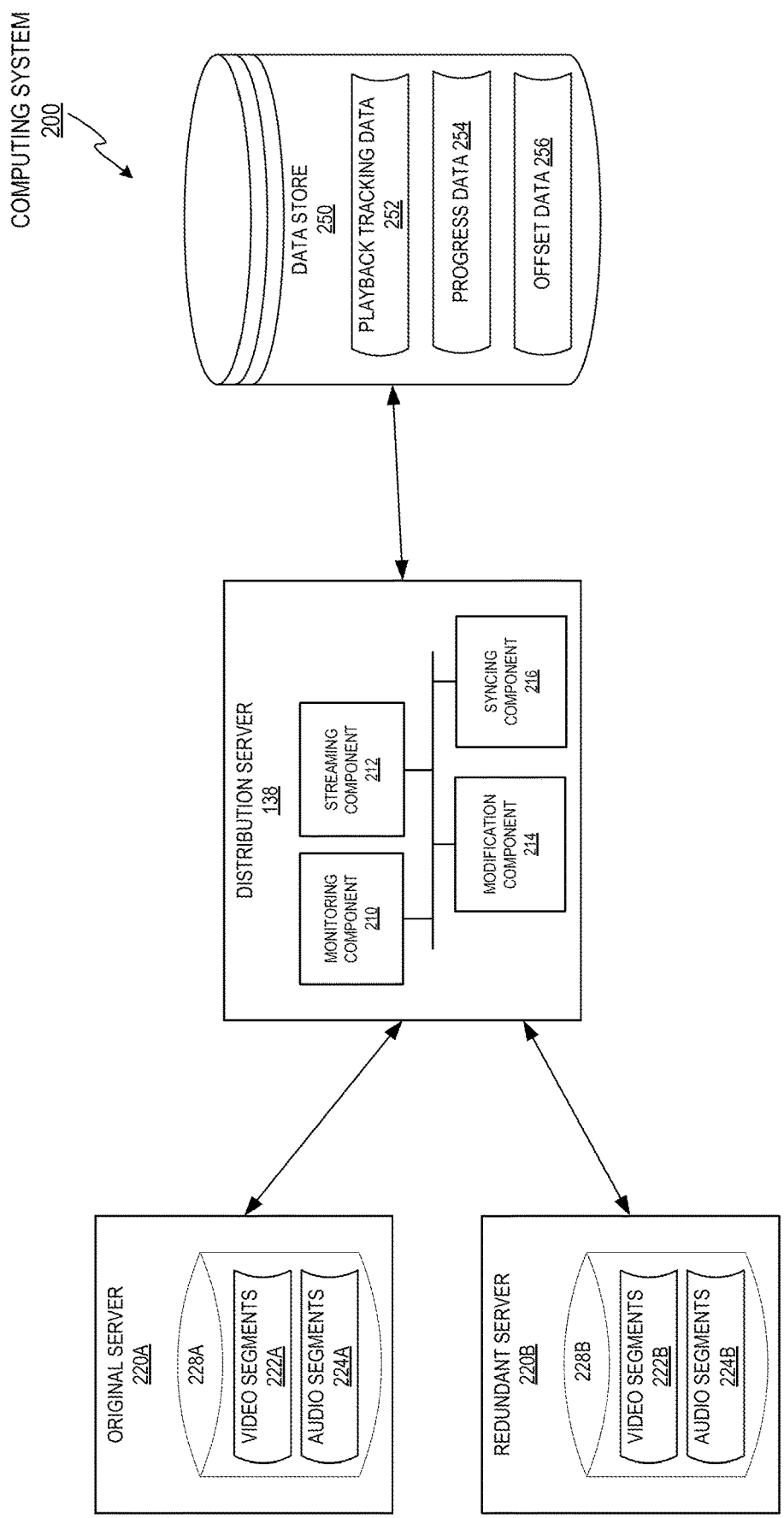
FIG. 2 is a block diagram illustrating an example computer system 200, in accordance with implementations of the disclosure.

FIG. 2 is a block diagram illustrating an example computer system 200, in accordance with implementations of the disclosure. Computer system 200 may be the same or similar to CDN 130 of FIG. 1. In the example shown in FIG. 2, computer system 200 includes original server 220A, redundant server 220B, distribution server 138, and data store 230. Distribution server 138 can include monitoring component 210, streaming component 212, modification component 214, and syncing component 216.

Original server 220A and redundant server 220B can each be an edge server and similar to server machine 132A-132Z. Original server 220A can be an edge server from which the media segments for a live-stream media item are initially obtained (by the distribution server 138). Redundant server 220B can be the edge node to which the distribution server 138 switched to continue receiving media segments related to the live-stream media item. Original server 220A and redundant server 220B can each include a respective data store 228A, 228B. Data store 228A can store video segments 222A and audio segments 224A, related to the live-stream media item, and processed and encoded by original server 220A. Data store 228B can store video segments 222B and audio segments 224B, related to the live-stream media item, and processed and encoded by redundant server 220B.

Each edge server 220A, 220B can mark received audio frames and image frames with a timestamp. In some implementations, the timestamps can be generated based on a local timer, a clock, etc. A local timer can be a timer initiated and used by a particular edge server 220A, 220B. In some implementations, the timer can be initiated in response to the initiating of the server (e.g., once the server begins to run or goes "live"). In some implementations, the time can be initiated for a particular media stream. For example, in response to the edge server receiving a first frame of a media item, the timer can be initiated. A clock can refer to a clock initiated by the edge server, to a local clock (e.g., eastern time zone clock), to a universal clock (e.g., a coordinated universal time clock), etc.

In response to the initiation of playback of a live-streaming media item on a media player, monitoring component 210 can track the timestamps of media segments sent to the media player. In some implementations, monitoring component 210 can record the start time of the playback. This allow monitoring component 210 to track which timestamp is expected throughout the duration of the playback. In some implementations, for each media segment sent from an edge server (e.g., original server 220A or redundant server 220B) to the media player, monitoring component 210 can track the timestamps of the respective audio and image frames. In some implementations, this data can be stored as in data store 250 as playback tracking data 252. Data store 250 can be a local data store of distribution server 138 or a remote data store (e.g., data store 106). In an illustrative example, playback tracking data 252 can be a data structure, such as a metadata table, used to track the timestamp data. This allows the distribution server 138 to identify the expected timestamps of subsequent frames.

Monitoring component 210 can further track which edge servers are performing encoding operations related to a particular live-stream media item. In some implementations, monitoring component 210 can receive progress data 252 from each edge server (e.g., original server 220A and redundant server 220B). The progress data can be indicative of which video segments and audio segments the respective edge server encoded and stored. Each video segment and audio segment can be identified using media segment identification data. For example, original server 220A can send progress data to monitoring component 210 indicating that original server 220A has encoded and stored video segments 0-5 and audio segments 0-5. In some implementations, the progress data can include the timestamp data for each image frame and audio frame in the video and audio segments, respectively.

In some implementations, progress data 254 can be a data structure that includes a listing of a respective edge server (e.g., an edge server identifier), the available media segments generated by the respective edge server, and the timestamps for one or more frames of the available media segments (e.g., the timestamps of the keyframes for each media segment, the timestamps of each frame, etc.).

Streaming component 212 can select an edge server for streaming a live-stream media item to a media player. In particular, streaming component 212 can select from which edge server to obtain media segments related to the live-stream media item. An initial edge server (e.g., original server 220A) can be selected based on one or more factors, such as, for example, which edge server is first to receive stream data from a media capturing device, which edge server is closest to the media capturing device, which edge server is closest to the client device, based on one or more hardware components of the edge server, etc. In certain implementations, streaming component 212 can switch the edge server used for streaming the live stream media item (e.g., switch from obtaining media segments from original server 220A to obtaining media segments from redundant server 220B). The switch can be in response to the original server 220A experiencing a hardware or software failure, requiring a firmware or software update, requiring a reset of a virtual machine or container, a relocation of the client device, etc.

Modification component 214 modifies the timestamps of media segments received from a switched edge server (e.g., redundant server 220B). In some implementations, the modification component 214 can generate an offset value to apply to the timestamps of the media segments received from redundant server 220B. The offset value can be stored as offset data 256. In some implementations, the offset value can reflect the difference between 1) the timestamp and duration of the last frame rendered on the playback device ("end value") and 2) the difference between the end value and the timestamp of the first frame of the next media segment to be sent from redundant server 220B to the playback device. For example, if the last frame rendered from the original server 220A has a timestamp of 100 seconds and a duration of 0.5 seconds, and the timestamp of the next frame to be rendered from redundant server 220B is 10 s, then the offset value is 90.5 second (offset value= (100+0.5)−(10)). Modification component 214 can apply this offset value to the timestamps of each frame received redundant server 220B. For example, modification component 214 can add the offset value to the timestamp values of the audio frames and image frames received from redundant server 220B.

In some implementations, multiple offset values can be generated, for a particular media stream, by the modification component 214. In particular, different offset values can be generated for each component of the media stream. For example, for the image frames of the media item, a first offset value can be applied to the timestamps of each image frame, while for the audio frames of the media item, a different value can be applied to the timestamps of each image frame. This can result due to the audio frame durations being different from the image frame durations.

In some implementations, the offset value can reflect a difference in values between the timestamps of the media segments received from original server 220A and the timestamps of the media segments received from redundant server 220B. Modification server can then apply the offset value to the respective timestamps of the audio frames and image frames received from redundant server 220B.

Figure 3:
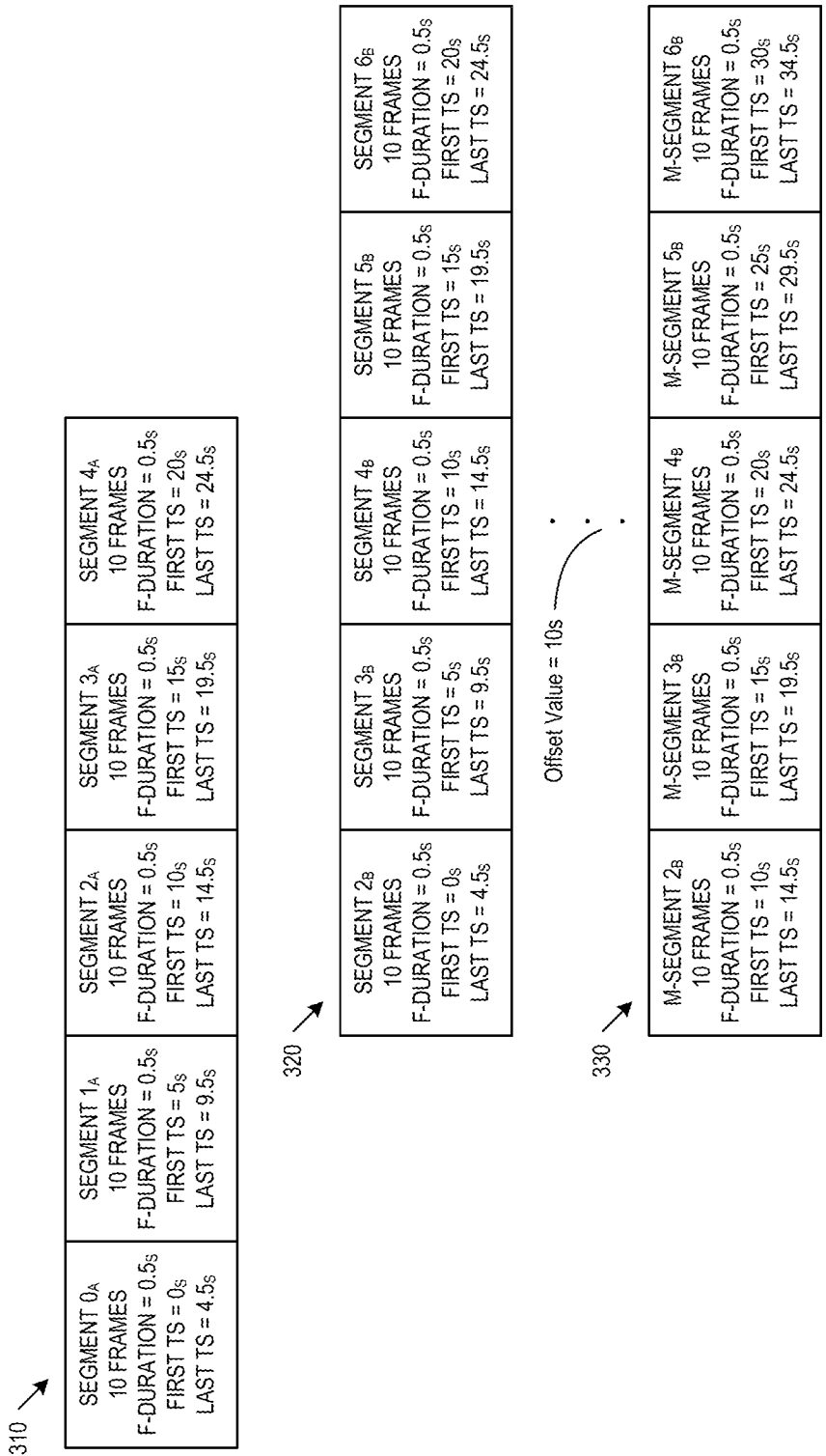
FIG. 3 is a block diagram illustrating the modification of timestamps after an edge server switch, in accordance with implementations of the disclosure.

FIG. 3 is a block diagram illustrating the modification of timestamps after switching an edge server, in accordance with implementations of the disclosure. Media segments 310 are received from an initial edge server (e.g., original server 220A). Each media segment (e.g., segment $0_A$, segment $1_A$, . . . , segment $4_A$) can include 10 frames (e.g., image frames or audio frames), where each frame has a duration of 0.5 s. The number sequence (e.g., segment 0, segment 1, etc.) can represent the segment sequence number from the initiation of playback of the live-stream media item. Initial edge server starts encoding once the live-stream begins and can mark the received and encoded frames using locally synchronized timestamps starting at t=0 s.

Media segments 320 are received from a redundant edge server (e.g., redundant server 220B). The redundant edge server can be initiated 10 seconds into the live-stream and, thus, the first segment the redundant server receives is the third segment of the live-stream. The redundant edge server begins encoding and can mark the received and encoded frames using locally synchronized timestamps starting at t=0 s. Thus, the initial edge server marks the 10 frames of the third segment (i.e., segment $2_A$) starting with a timestamp of 10 s while the redundant edge server marks the 10 frames of the third segment (i.e., segment $2_B$) starting with a timestamp of 0 s.

In an illustrative example, the initial edge server fails after encoding and storing segment $4_A$. Accordingly, distribution server 138 can switch to receiving media segment from the redundant edge server. To prevent a fault by the media player, modification component 214 of FIG. 2 can determine an offset value to be applied to the frames encoded by the redundant edge server. The offset value can be reflective of the difference between the timestamps of corresponding media segment encoded by initial edge server and the redundant edge server. For example, modification component 214 can subtract the timestamp of the first frame of segment $2_B$ (i.e., ts=0 s) from the timestamp of the first frame of segment $2_A$ (i.e., ts=10 s). Thus, the offset value is 10 s. In some implementations, modification component 214 can subtract the timestamp of the last frame of segment $2_B$ (i.e., ts=4.5 s) from the timestamp of the last frame of segment $2_A$ (i.e., ts=14.5 s). In other implementations, modification component 214 can subtract the timestamp of any other frame of segment $2_B$ from the timestamp of the any frame of segment $2_A$. Modification component 214 can apply the offset value to each frame received from the redundant edge server to generate media segments 330. As shown, the timestamps of the frames of modified media segments 330 match the corresponding frames of media segments 310. Streaming component 212 of FIG. 2 can then send the next expected media segment to the media player. For example, if the last media segment sent to the media player was segment $3_A$, streaming component 212 can then send media segment $4_B$. In some implementations, the initial edge server can send, to the media player, the entirety of its encoded segments (e.g., segments $0_A$-$4_A$) and then the redundant edge server can take over (e.g., via segment $5_B$).

Returning to FIG. 2, syncing component 216 can modify the audio segments to prevent desynchronization of the audio stream with the video stream. To prevent desynchronization, syncing component 216 can add or remove audio frames from an audio segment. In some implementations, syncing component 216 can determine whether the audio stream is ahead of the respective video stream, or behind the respective video stream. In some implementations, syncing component 216 can determine which stream is ahead based the durations of one or more previous audio and video segments (e.g., maintain a counter reflecting the total or partial duration of the audio segments and a counter reflecting the total or partial duration of the video segments, and determine a different of the counter value to determine which stream is ahead or behind). In another embodiment, syncing component can use the timestamps of the audio and image frames to determine which stream is ahead (e.g., based on the first or last timestamp in respective segments). In response to the audio stream being behind the respective video stream, syncing component 216 remove one or more audio frames from the subsequent audio segment. For example, syncing component 216 can remove one or more leading audio frames from the front of the audio segment.

In response to the audio stream being ahead of the respective video steam, syncing component 216 can add one or more audio frames to the subsequent audio segment. In an illustrative example, syncing component 216 can obtain one or more audio frames from the end of a preceding audio segment and add these audio frames to the beginning of the subsequent audio segment. These one or more audio frames can be duplicates of the end audio frames of the preceding audio segment. The number of audio frames can be determined based on how many audio frames need to be added or removed to obtain the lowest possible time difference between the respective first frame of corresponding audio and video segments or the respective last frame of audio and video corresponding segments. For example, in response to determining that the audio stream is behind the respective video steam by 0.045 seconds, where each audio frame is 0.025 seconds, syncing component 216 can obtain two audio frames from the end of the preceding audio segment and add the two audio frames to the beginning of the subsequence audio frame. In some implementations, a predetermined amount of end audio frames can be stored in a data store for one or more rendered audio segments. This allows the syncing component 216 to obtain the end audio frames to add to respective subsequent audio frames.

Figure 4:
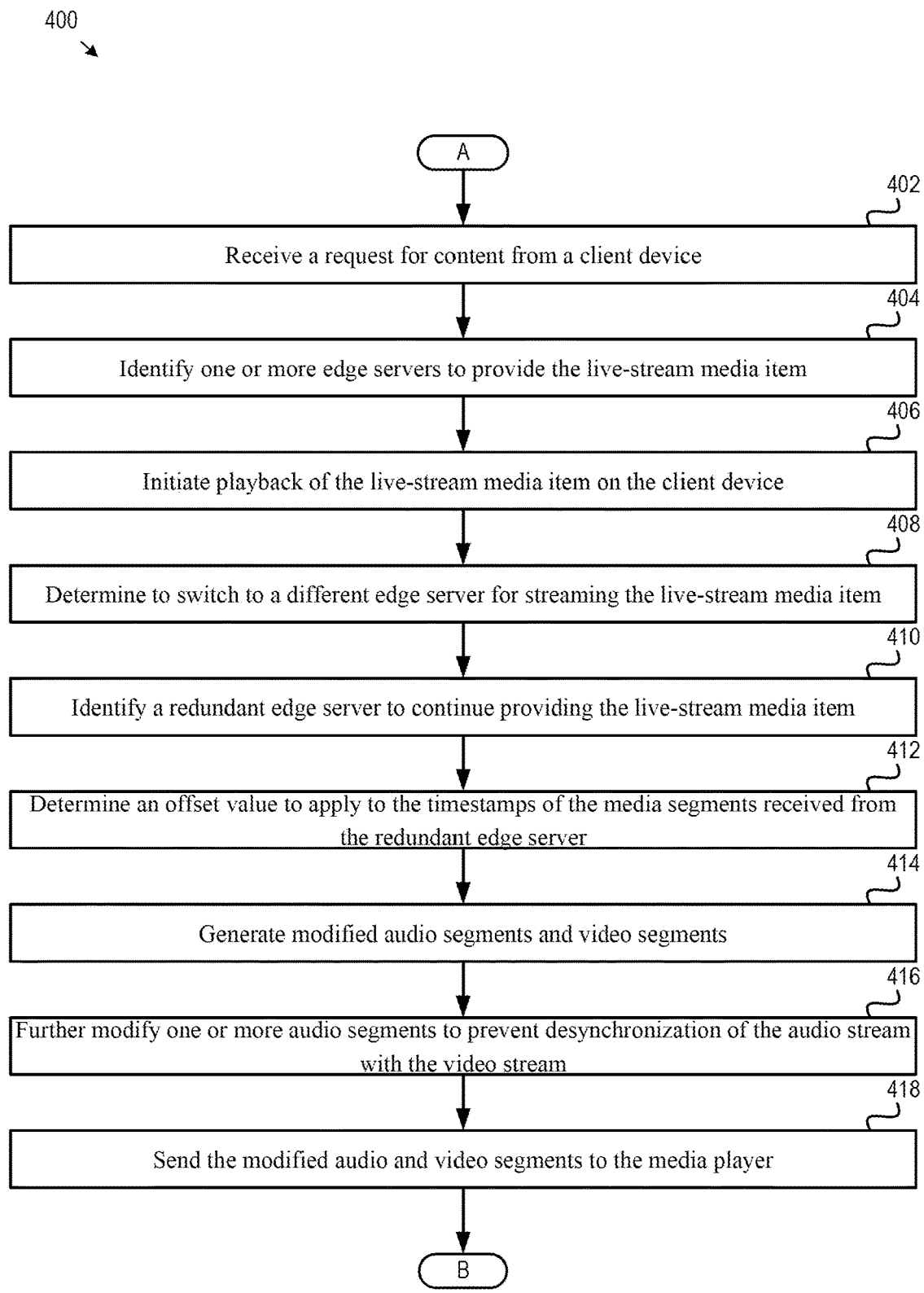
FIG. 4 depicts a flow diagram of a method for switching playback from a stream of a first edge server to a stream of a second edge server, in accordance with implementations of the disclosure.

FIG. 4 depicts a flow diagram of a method 400 for switching playback from a stream of a first edge server to a stream of a second edge server, in accordance with implementations of the disclosure. The method is performed by processing logic that can include hardware (circuitry, dedicated logic, etc.), software (e.g., instructions run on a processing device), or a combination thereof. In some implementations, some or all of the operations of method 400 can be performed by one or more components of system 100 of FIG. 1. In other implementations, one or more operations of method 400 can be performed by the distributed server 138 of CDN 130, as described with respect to FIG. 1-2. It can be noted that components described with respect to FIG. 1-2 can be used to illustrate aspects of FIG. 4.

At operation 402, processing logic implementing method 400 receives a request for content from a client device. For example, the processing logic can request playback of a live-stream media item.

At operation 404, the processing logic identifies one or more edge servers to provide the live-stream media item. The processing logic can identify the edge server based on a location or address from which the live-stream media item can be retrieved. If multiple edge server are capable of providing the live-stream media item, the processing logic can select one of the edge servers based on, for example, which edge server is first to receive stream data from a media capturing device, which edge server is closest to the media capturing device, which edge server is closest to the client device, based on one or more hardware components of the edge server, etc.

At operation 406, processing logic initiates playback of the live-stream media item on the client device. For example, the processing logic can provide, to the media player of the client device, the video data and/or audio data associated with the live-stream media item. The video data and/or audio data can be transmitted in the form of video segments and audio segments received from the initial edge server.

During playback, the processing logic can track which edge servers are performing encoding operations related to the live-stream media item. In some implementations, the processing logic can receive progress data, from each edge server, indicative of which video segments and audio segments the respective edge server encoded and stored.

At operation 408, processing logic determines to switch to a different edge server for streaming the live-stream media item. In some implementations, the processing logic can receive an indication that the streaming edge server ceased (or will cease) providing the media stream. For example, the processing logic can receive an indication that the edge server experienced a hardware or software failure, requires a firmware or software update, requires a reset of a virtual machine or container, etc. In some implementations, the processing logic can determine that the client device relocated, and select a new edge server in response to the relocation.

At operation 410, processing logic identifies a redundant edge server to continue providing the live-stream media item. The processing logic can then receive audio segments and video segments from the redundance edge server.

At operation 412, processing logic determines an offset value to apply to the timestamps of the media segments received from the redundant edge server. In some implementations, the offset value can reflect the difference between the timestamp and duration of the last frame rendered on the playback device and the timestamp of the first frame of the next media segment to be sent from redundant edge server to the playback device. In some implementations, the offset value can reflect a difference in values between the timestamps of the media segments received from the initial edge server and the timestamps of the media segments received from the redundant edge server. In some implementations, multiple offset value can be determined. For example, the processing logic can determine a first offset value to be applied to the timestamps of audio frames and a second offset value to be applied to the timestamps of image frames.

At operation 414, processing logic generates modified audio segments and video segments. In particular, the processing logic applies the offset value to the timestamps of the audio frames and image frames from the audio segments and video segments received from the redundant edge server.

At operation 416, processing logic further modifies one or more audio segments to prevent desynchronization of the audio stream with the video stream. In some implementations, the processing logic can determine whether the audio stream is ahead of the respective video stream, or behind the respective video stream. In response to the audio stream being behind the respective video stream, the processing logic can remove one or more audio frames from the subsequent audio segment. For example, the processing logic can remove one or more leading audio frames from the front of the audio segment.

In response to the audio stream being ahead the respective video steam, the processing logic can add one or more audio frames to the subsequent audio segment. For example, the processing logic can obtain one or more audio frames from the end of a preceding audio segment and add these audio frames to the beginning of the subsequent audio frame.

At operation 418, processing logic sends the modified audio and video segments to the media player.

Figure 5:
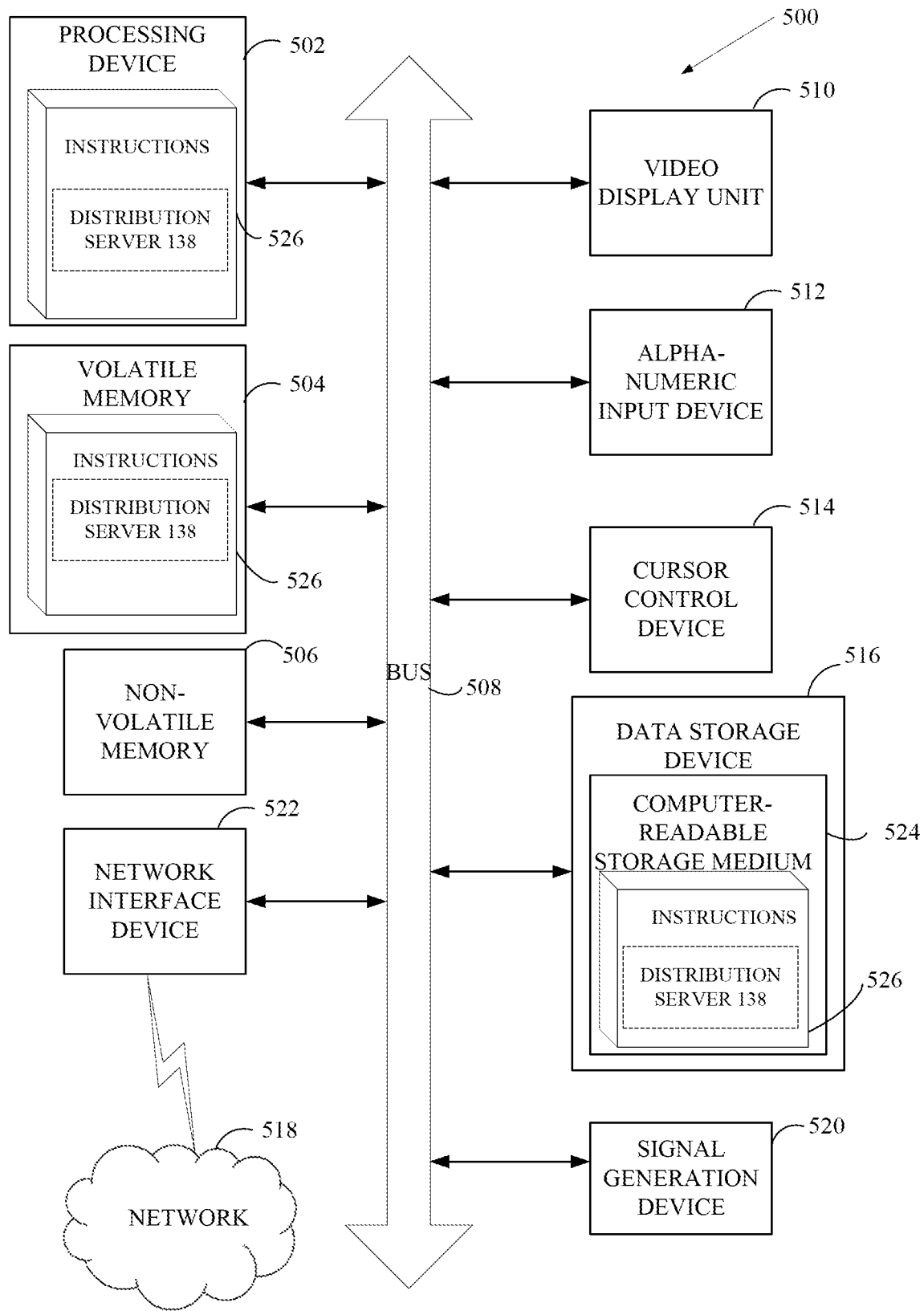
FIG. 5 is a block diagram illustrating an exemplary computer system, in accordance with an implementation of the disclosure.

FIG. 5 is a block diagram illustrating an exemplary computer system 500, in accordance with an implementation of the disclosure. The computer system 500 executes one or more sets of instructions that cause the machine to perform any one or more of the methodologies discussed herein. Set of instructions, instructions, and the like can refer to instructions that, when executed by computer system 500, cause computer system 500 to perform one or more operations of distribution server 138, and/or content sharing platform 120 (not shown). The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage device 516, which communicate with each other via a bus 508.

The processing device 502 represents one or more general-purpose processing devices such as a microprocessor, central processing unit, or the like. More particularly, the processing device 502 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and authorization module 151 for performing the operations discussed herein.

The computer system 500 can further include a network interface device 522 that provides communication with other machines over a network 518, such as a local area network (LAN), an intranet, an extranet, or the Internet. The computer system 500 also can include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 can include a non-transitory computer-readable storage medium 524 on which is stored the sets of instructions of the system architecture 100, content sharing platform 120, or of distribution server 138 embodying any one or more of the methodologies or functions described herein. The sets of instructions of the system architecture 100, content sharing platform 120, or of distribution server 138 can also reside, completely or at least partially, within the main memory 504 and/or within the processing device 502 during execution thereof by the computer system 500, the main memory 504 and the processing device 502 also constituting computer-readable storage media. The sets of instructions can further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general-purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" throughout is not intended to mean the same implementation or implementations unless described as such. The terms "first," "second," "third," "fourth," etc. as used herein are meant as labels to distinguish among different elements and can not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above-described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure can, therefore, be determined with reference to the appended claims, along with the full scope of equivalents to which such claims are entitled.

What is claimed is:

1. A method, comprising:
   receiving, by a processor, from a first server, a first plurality of frames of a first type associated with a media item, wherein each frame of the first plurality of frames is associated with a respective timestamp of a first plurality of timestamps generated by the first server;
   sending at least a subset of the first plurality of frames to a client device;
   receiving, from a second server, a second plurality of frames of the first type associated with the media item, wherein the second plurality of frames are each associated with a respective timestamp of a second plurality of timestamps generated by the second server;
   determining an offset value between a first timestamp of the first plurality of timestamps and a second timestamp of the second plurality of timestamps;
   generating a modified plurality of frames of the first type by modifying, based on the offset value, each timestamp of a subset of the second plurality of timestamps; and
   sending the modified plurality of frames to the client device.

2. The method of claim 1, further comprising:
   receiving, from the second server, a third plurality of frames of a second type associated with the media item, wherein each frame of the third plurality of frames is associated with a respective timestamp of a third plurality of timestamps generated by the second server;
   generating a modified plurality of frames of the second type by modifying, based on the offset value, each timestamp the third plurality of timestamps; and
   sending the modified plurality of frames to the client device.

3. The method of claim 2, further comprising:
   receiving, from the second server, an audio segment comprising a subset of the third plurality of frames;
   generating a modified audio segment by removing one or more audio frames from the audio segment; and
   sending the modified audio segment to the client device.

4. The method of claim 2, further comprising:
   receiving, from the second server, a first segment comprising a subset of the third plurality of frames;
   generating a modified segment by adding one or more frames of the second type from a second segment to the first segment; and
   sending the modified segment to the client device.

5. The method of claim 2, wherein the frames of the second type are audio frames.

6. The method of claim 1, further comprising:
   receiving, from the first server, a third plurality of frames of a second type associated with the media item, wherein each frame of the third plurality of frames is associated with a respective timestamp of a third plurality of timestamps generated by the first server;

receiving, from the second server, a fourth plurality of frames of the second type associated with the media item, wherein each frame of the fourth plurality of frames is associated with a respective timestamp of a fourth plurality of timestamps generated by the second server;

determining another offset value between a third timestamp of the third plurality of timestamps and a fourth timestamp of the fourth plurality of timestamps;

generating a second modified plurality of frames of the second type by modifying, based on the another offset value, each timestamp of a subset of the fourth plurality of timestamps; and sending the second modified plurality of frames to the client device.

7. The method of claim 1, wherein the media item is a live-stream video item.

8. The method of claim 1, wherein the frames of the first type are image frames.

9. A system comprising:
a memory; and
a processing device coupled to the memory, the processing device to perform operations comprising:
receiving, from a first server, a first plurality of frames of a first type associated with a media item, wherein each frame of the first plurality of frames is associated with a respective timestamp of a first plurality of timestamps generated by the first server;
sending at least a subset of the first plurality of frames to a client device;
receiving, from a second server, a second plurality of frames of the first type associated with the media item, wherein the second plurality of frames are each associated with a respective timestamp of a second plurality of timestamps generated by the second server;
determining an offset value between a first timestamp of the first plurality of timestamps and a second timestamp of the second plurality of timestamps;
generating a modified plurality of frames of the first type by modifying, based on the offset value, each timestamp of a subset of the second plurality of timestamps; and
sending the modified plurality of frames to the client device.

10. The system of claim 9, wherein the operations further comprise:
receiving, from the second server, a third plurality of frames of a second type associated with the media item, wherein each frame of the third plurality of frames is associated with a respective timestamp of a third plurality of timestamps generated by the second server;
generating a modified plurality of frames of the second type by modifying, based on the offset value, each timestamp the third plurality of timestamps; and
sending the modified plurality of frames to the client device.

11. The system of claim 10, wherein the operations further comprise:
receiving, from the second server, an audio segment comprising a subset of the third plurality of frames;
generating a modified audio segment by removing one or more audio frames from the audio segment; and
sending the modified audio segment to the client device.

12. The system of claim 10, wherein the operations further comprise:

receiving, from the second server, a first segment comprising a subset of the third plurality of frames;
generating a modified segment by adding one or more frames of the second type from a second segment to the first segment; and
sending the modified segment to the client device.

13. The system of claim 10, wherein the frames of the second type are audio frames.

14. The system of claim 9, wherein the operations further comprise:
receiving, from the first server, a third plurality of frames of a second type associated with the media item, wherein each frame of the third plurality of frames is associated with a respective timestamp of a third plurality of timestamps generated by the first server;
receiving, from the second server, a fourth plurality of frames of the second type associated with the media item, wherein each frame of the fourth plurality of frames is associated with a respective timestamp of a fourth plurality of timestamps generated by the second server;
determining another offset value between a third timestamp of the third plurality of timestamps and a fourth timestamp of the fourth plurality of timestamps;
generating a second modified plurality of frames of the second type by modifying, based on the another offset value, each timestamp of a subset of the fourth plurality of timestamps; and
sending the second modified plurality of frames to the client device.

15. The system of claim 9, wherein the media item is a live-stream video item.

16. The system of claim 9, wherein the frames of the first type are image frames.

17. A non-transitory computer-readable medium comprising instructions that, responsive to execution by a processing device, cause the processing device to perform operations comprising:
receiving, from a first server, a first plurality of frames of a first type associated with a media item, wherein each frame of the first plurality of frames is associated with a respective timestamp of a first plurality of timestamps generated by the first server;
sending at least a subset of the first plurality of frames to a client device;
receiving, from a second server, a second plurality of frames of the first type associated with the media item, wherein the second plurality of frames are each associated with a respective timestamp of a second plurality of timestamps generated by the second server;
determining an offset value between a first timestamp of the first plurality of timestamps and a second timestamp of the second plurality of timestamps;
generating a modified plurality of frames of the first type by modifying, based on the offset value, each timestamp of a subset of the second plurality of timestamps; and
sending the modified plurality of frames to the client device.

18. The non-transitory computer readable storage medium of claim 17, wherein the operations further comprise:
receiving, from the second server, a third plurality of frames of a second type associated with the media item, wherein each frame of the third plurality of frames is associated with a respective timestamp of a third plurality of timestamps generated by the second server;

generating a modified plurality of frames of the second type by modifying, based on the offset value, each timestamp the third plurality of timestamps; and sending the modified plurality of frames to the client device.

19. The non-transitory computer readable storage medium of claim 17, wherein the operations further comprise:

receiving, from the second server, an audio segment comprising a subset of the second plurality of audio frames;

generating a modified audio segment by removing one or more audio frames from the audio segment; and sending the modified audio segment to the client device.

20. The non-transitory computer readable storage medium of claim 17, wherein the operations further comprise:

receiving, from the second server, a first segment comprising a subset of the third plurality of frames;

generating a modified segment by adding one or more frames of the second type from a second segment to the first segment; and sending the modified segment to the client device.

* * * * *